US011834558B2

(12) United States Patent
Yu et al.

(10) Patent No.: US 11,834,558 B2
(45) Date of Patent: Dec. 5, 2023

(54) ADDITIVE COMPOSITIONS AND THERMOPLASTIC POLYMER COMPOSITIONS COMPRISING THE SAME

(71) Applicant: Milliken & Company, Spartanburg, SC (US)

(72) Inventors: Xinfei Yu, Greer, SC (US); Christopher Kochanowicz, Spartanburg, SC (US); Nathan Mehl, Spartanburg, SC (US); Keith Keller, Spartanburg, SC (US); Brent Johnson, Spartanburg, SC (US); Clifford Bynum, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 818 days.

(21) Appl. No.: 16/721,199

(22) Filed: Dec. 19, 2019

(65) Prior Publication Data

US 2020/0199308 A1    Jun. 25, 2020

Related U.S. Application Data

(60) Provisional application No. 62/783,316, filed on Dec. 21, 2018.

(51) Int. Cl.
| | | |
|---|---|---|
| C08J 3/22 | (2006.01) | |
| C08K 3/04 | (2006.01) | |
| C08K 3/34 | (2006.01) | |
| C08K 5/1575 | (2006.01) | |

(52) U.S. Cl.
CPC ............. *C08J 3/226* (2013.01); *C08K 3/04* (2013.01); *C08K 3/34* (2013.01); *C08K 5/1575* (2013.01); *C08J 2323/12* (2013.01)

(58) Field of Classification Search
CPC ......... C08J 3/226; C08J 2323/12; C08K 3/04; C08K 3/34; C08K 5/1575
See application file for complete search history.

(56) References Cited

U.S. PATENT DOCUMENTS

| | | | |
|---|---|---|---|
| 3,852,237 | A | 12/1974 | Osborn |
| 4,731,400 | A | 3/1988 | Shigemoto |
| 4,820,755 | A | 4/1989 | Webster |
| 5,003,500 | A | 3/1991 | Gerber |
| 5,262,471 | A | 11/1993 | Akao |
| 5,859,708 | A | 1/1999 | Feldman |
| 5,961,914 | A | 10/1999 | Mannion |
| 7,683,129 | B2 | 3/2010 | Mehta |
| 8,232,335 | B2 | 7/2012 | Danielson |
| 8,653,165 | B2 | 2/2014 | Danielson |
| 10,800,902 | B2 | 10/2020 | Danielson |
| 2004/0180159 | A1 | 9/2004 | Neal |
| 2004/0219319 | A1 | 11/2004 | Brooks |
| 2006/0178483 | A1 | 8/2006 | Mehta |
| 2007/0066733 | A1 | 3/2007 | Hanssen |
| 2007/0185247 | A1 | 8/2007 | Danielson |
| 2007/0197697 | A1 | 8/2007 | Botkin |
| 2007/0228615 | A1 | 10/2007 | Brooks |
| 2009/0105404 | A1 | 4/2009 | Van Riel |
| 2009/0258560 | A1 | 10/2009 | Kristiansen |
| 2010/0204374 | A1 | 8/2010 | Tanji |
| 2016/0136860 | A1 | 5/2016 | Smith |
| 2018/0171102 | A1 | 6/2018 | Canada |

FOREIGN PATENT DOCUMENTS

| | | |
|---|---|---|
| CN | 1443801 | 9/2003 |
| CN | 1443801 A | 9/2003 |
| CN | 101065434 | 10/2007 |
| CN | 102341449 | 2/2012 |
| CN | 102449059 | 5/2012 |
| CN | 102575060 | 7/2012 |
| CN | 103391966 | 11/2013 |
| CN | 105764971 | 7/2016 |
| EP | 0969036 | 1/2000 |
| EP | 1375582 | 1/2004 |
| JP | S6422952 | 1/1989 |
| JP | 199607366 | 3/1996 |
| JP | 199817848 | 1/1998 |
| JP | 1999349740 | 12/1999 |
| JP | 2000111408 | 4/2000 |
| JP | 2000302986 | 10/2000 |
| JP | 2007161958 | 6/2007 |
| JP | 2009155422 | 7/2009 |
| JP | 2009526123 | 7/2009 |
| JP | 2012233149 | 11/2012 |
| JP | 2013513014 | 4/2013 |
| JP | 2015063678 | 4/2015 |
| WO | 2002078924 | 10/2002 |
| WO | 2005115723 | 12/2005 |
| WO | 2007033297 | 3/2007 |
| WO | 2007092462 | 8/2007 |
| WO | 2008011402 | 1/2008 |
| WO | 2011071718 | 6/2011 |
| WO | 2012102805 | 8/2012 |
| WO | 2015042565 | 3/2015 |
| WO | 2017003802 | 1/2017 |

*Primary Examiner* — Edward J Cain
(74) *Attorney, Agent, or Firm* — Robert M. Lanning

(57) ABSTRACT

A thermoplastic polymer composition comprises a thermoplastic polymer, at least one clarifying agent, and at least one coloring agent. A method for producing a thermoplastic polymer composition comprises the steps of separately providing a thermoplastic polymer and an additive composition and then mixing the thermoplastic polymer and additive composition. The additive composition comprises a clarifying agent and a coloring agent. Another method for producing a thermoplastic polymer composition comprises the steps of separately providing a thermoplastic polymer, at least one clarifying agent, and at least one coloring agent and then mixing the thermoplastic polymer, the clarifying agent, and the coloring agent. The thermoplastic polymer exhibits a blue hue factor ($\alpha$) of 0.93 to 1.1 and/or a normalized brightness value (Y') of 64.0 to 69.6. An additive composition contains at least one clarifying agent and at least one coloring agent.

37 Claims, No Drawings

ADDITIVE COMPOSITIONS AND THERMOPLASTIC POLYMER COMPOSITIONS COMPRISING THE SAME

CROSS-REFERENCE TO RELATED PATENT APPLICATIONS

This application claims, pursuant to 35 U.S.C. § 119(e), priority to and the benefit of the filing date of U.S. Patent Application No. 62/783,316 filed on Dec. 21, 2018, the contents of which are hereby incorporated by reference.

TECHNICAL FIELD OF THE INVENTION

The subject matter of this application and the inventions described herein are generally directed to additive compositions and thermoplastic polymer compositions containing such additive compositions.

BACKGROUND

Thermoplastic polymers have become ubiquitous in the modern world. The versatility of thermoplastic polymers and the relative ease with which they can be processed into myriad different forms have contributed to their rise to ubiquity. This versatility is partly attributable to the nature of the thermoplastic polymers themselves, but at least a portion of this versatility is attributable to the development of additives that permit manufacturers to bend, within reasonable limits, the physical properties of these polymers to their will.

For example, polypropylene homopolymers and polypropylene copolymers, which are typically only slightly translucent, can be made more translucent or even virtually transparent using a class of additives known as clarifying agents. The development and use of such clarifying agents have opened up an entirely new range of applications for polypropylene polymers, a range of applications that was previously reserved for those polymers which are naturally or more readily made translucent or transparent (e.g., polystyrene). For instance, clarifying agents have made it possible to use polypropylene polymers in transparent packaging and containers.

While the development and use of certain additives (e.g., clarifying agents) have enabled improvements in certain physical properties of thermoplastic polymers, there remains room for improvement. In particular, the inventors believe that a need remains for combinations of additives that will further improve the perceived clarity or apparent haze of thermoplastic polymers, such as clarified polypropylene polymers. This application and the inventions described herein seek to address this need.

BRIEF SUMMARY OF THE INVENTION

The invention generally provides additive compositions suitable for addition to thermoplastic polymers, thermoplastic polymer compositions containing a clarifying agent and at least one coloring agent, and methods for making such thermoplastic polymer compositions. In general, the additive compositions comprise a clarifying agent and a relatively low level of at least one coloring agent, where the type and amount of coloring agent is selected so that a thermoplastic polymer composition containing the additive composition exhibits a blue hue factor and/or a normalized brightness value falling within specified ranges. Similarly, the thermoplastic polymer compositions of the invention contain a clarifying agent and at least one coloring agent, where the type and amount of coloring agent(s) is selected so that the thermoplastic polymer composition exhibits a blue hue factor and/or a normalized brightness value falling within specified ranges. Thermoplastic polymer compositions exhibiting the specified blue hue factor and/or normalized brightness value are believed to possess a combination of desirable properties. First, it is believed that such compositions exhibit less apparent haze than compositions that do not possess the described blue hue factor and/or normalized brightness value. As used herein, the term "apparent haze" is used to describe the visually perceived haziness or cloudiness of a thermoplastic polymer composition, which is often observed when looking through an article (e.g., a plaque or container) made from the thermoplastic polymer composition. Second, it is believed that compositions exhibiting the specified blue hue factor and/or normalized brightness value do not exhibit any appreciable, visually perceptible coloration.

In a first embodiment, the invention provides a thermoplastic polymer composition comprising: (a) a thermoplastic polymer; (b) at least one clarifying agent; and (c) at least one coloring agent, wherein the amount of clarifying agent in the thermoplastic polymer composition is from about 50 ppm to about 5,000 ppm based on the total weight of the thermoplastic polymer composition, and the thermoplastic polymer exhibits a blue hue factor ($\alpha$) of 0.93 to 1.1 and a normalized brightness value (Y') of 64.0 to 69.6.

In a second embodiment, the invention provides a method for producing a thermoplastic polymer composition, the method comprising the steps of: (a) providing a thermoplastic polymer; (b) providing an additive composition comprising: (i) at least one clarifying agent; (ii) at least one coloring agent; and (c) mixing the thermoplastic polymer and the additive composition to produce a thermoplastic polymer composition, wherein the amount of clarifying agent in the thermoplastic polymer composition is from about 50 ppm to about 5,000 ppm based on the total weight of the thermoplastic polymer composition, and the thermoplastic polymer exhibits a blue hue factor ($\alpha$) of 0.93 to 1.1 and a normalized brightness value (Y') of 64.0 to 69.6.

In a third embodiment, the invention provides a method for producing a thermoplastic polymer composition, the method comprising the steps of: (a) providing a thermoplastic polymer; (b) providing at least one clarifying agent; (c) providing at least one coloring agent; and (d) mixing the thermoplastic polymer, the clarifying agent, and the coloring agent to produce a thermoplastic polymer composition, wherein the amount of clarifying agent present in the thermoplastic polymer composition is from about 100 ppm to about 5,000 ppm based on the total weight of the thermoplastic polymer composition, and the thermoplastic polymer exhibits a blue hue factor ($\alpha$) of 0.93 to 1.1 and a normalized brightness value (Y') of 64.0 to 69.6.

In a fourth embodiment, the invention provides an additive composition consisting essentially of: (a) at least one clarifying agent; and (b) at least one coloring agent, wherein the amount of coloring agents present in the additive composition is an amount such that a thermoplastic polymer composition made with the additive composition exhibits a blue hue factor ($\alpha$) of 0.93 to 1.1 and a normalized brightness value (Y') of 64.0 to 69.6, and the thermoplastic polymer composition comprises a thermoplastic polymer and the additive composition in an amount sufficient to provide about 100 ppm to about 5,000 ppm of the clarifying agent in the thermoplastic polymer composition.

DETAILED DESCRIPTION OF THE INVENTION

As described above, the invention provides additive compositions suitable for addition to thermoplastic polymers, thermoplastic polymer compositions containing at least one clarifying agent and at least one coloring agent, and methods for making such thermoplastic polymer compositions. The various aspects of these embodiments of the invention will be described below.

The thermoplastic polymer utilized in the invention can be any suitable thermoplastic polymer. As utilized herein, the term "thermoplastic polymer" refers to a polymeric material that will melt upon exposure to sufficient heat to form a flowable liquid and will return to a solidified state upon sufficient cooling. In certain preferred embodiments, the thermoplastic polymer is a polyolefin. The thermoplastic polymer can be any suitable polyolefin, such as a polypropylene, a polyethylene, a polybutylene, and a poly(4-methyl-1-pentene), and combinations or mixtures thereof. In certain preferred embodiments, the thermoplastic polymer is a polyolefin selected from the group consisting of polypropylene homopolymers (e.g., atactic polypropylene, isotactic polypropylene, and syndiotactic polypropylene), polypropylene copolymers (e.g., polypropylene random copolymers), and mixtures thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene). In such polypropylene random copolymers, the comonomer can be present in any suitable amount, but typically is present in an amount of about 10 wt. % or less (e.g., about 1 to about 7 wt. %, or about 1 to about 4.5 wt. %).

The clarifying agent utilized in the additive compositions and methods of the invention can be any suitable clarifying agent. Suitable clarifying agents include, but are not limited to, trisamides, bisphenol phosphates, carboxylate salts, and acetal compounds. For example, suitable trisamide clarifying agents include, but are not limited to, amide derivatives of benzene-1,3,5-tricarboxylic acid, derivatives of N-(3,5-bis-formylamino-phenyl)-formamide (e.g., N-[3,5-bis-(2,2-dimethyl-propionylamino)-phenyl]-2,2-dimethyl-propionamide), derivatives of 2-carbamoyl-malonamide (e.g., N,N'-bis-(2-methyl-cyclohexyl)-2-(2-methyl-cyclohexylcarbamoyl)-malonamide), and combinations thereof. Suitable bisphenol phosphate clarifying agents include 2,2'-methylenebis-(4,6-di-tert-butylphenyl) phosphate salts, such as aluminum 2,2'-methylenebis-(4,6-di-tert-butylphenyl) phosphate, lithium 2,2'-methylenebis(4,6-di-tert-butylphenyl)phosphate, and combinations thereof. Suitable carboxylate salt clarifying agents include, but are not limited to, salts of benzoic acid (e.g., sodium benzoate), salts of cyclohexane-1,2-dicarboxylic acid (e.g., calcium cyclohexane-1,2-dicarboxylate) and salts of bicyclo[2.2.1]heptane-2,3-dicarboxylic acid (e.g., disodium bicyclo[2.2.1]heptane-2,3-dicarboxylate).

Suitable acetal clarifying agents include the acetal compounds produced by the condensation reaction of a polyhydric alcohol and an aromatic aldehyde. Polyhydric alcohols suitable for producing such acetal clarifying agents include, but are not limited to, acyclic polyols, such as xylitol and sorbitol. Suitable polyhydric alcohols also include $C_1$-substituted alditols. As utilized herein, the term "$C_1$-substituted alditol" is used to refer to a compound in which a terminal carbon of an alditol (e.g., a terminal carbon atom which typically is substituted with a single hydroxy group) is substituted with an additional, non-hydrogen group. The $C_1$-substituted alditol can be substituted with any suitable group. In certain embodiments, the $C_1$-substituted alditol can be substituted with a group selected from the group consisting of alkyl groups, alkenyl groups, alkoxy groups, hydroxy alkyl groups, alkyl halide groups, and derivatives thereof. Aromatic aldehydes suitable for producing such acetal clarifying agents include, but are not limited to, aromatic aldehydes containing a single aldehyde group with the remaining positions on the aromatic ring being either unsubstituted or substituted. Thus, suitable aromatic aldehydes include benzaldehyde and substituted benzaldehydes (e.g., 3,4-dimethyl-benzaldehyde). In certain embodiments, the benzaldehyde can be substituted with one or more groups selected from the group consisting of alkyl groups, alkenyl groups, alkoxy groups, carboxyl groups, halogens, and aryl groups (e.g., phenyl groups). Suitable acetal compounds derived from the reaction between an acyclic polyol and a benzaldehyde compound include, but are not limited to, the acetal compounds disclosed in U.S. Pat. Nos. 5,135,975, 7,157,510 and 7,262,236, each of which is hereby incorporated by reference in its entirety. The acetal compounds produced by the above-described reaction can be mono-acetal, di-acetal, or tri-acetal compounds (i.e., compounds containing one, two, or three acetal groups, respectively), with the di-acetal compounds being preferred.

In certain embodiments, the acetal clarifying agent can be an acetal compound conforming to the structure of Formula (I):

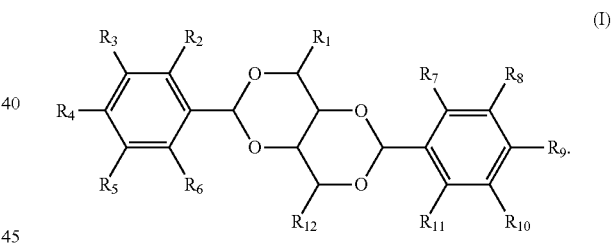

In the structure of Formula (I), $R_1$ is selected from the group consisting of hydrogen, alkyl groups, alkenyl groups, hydroxyalkyl groups, alkoxy groups, alkyl halide groups, and derivatives thereof. $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkoxy groups, alkenyl groups, aryl groups, carboxyl groups, and halogens. $R_{12}$ is a hydroxyalkyl group selected from the group consisting of —CH$_2$OH and —CH(OH)CH$_2$OH.

In certain embodiments of the invention, $R_1$ is selected from the group consisting of alkyl groups and alkenyl groups, $R_2$, $R_3$, $R_5$, $R_6$, $R_7$, $R_8$, $R_{10}$, and $R_{11}$ are each hydrogen, $R_{12}$ is —CH(OH)CH$_2$OH, and $R_4$ and $R_9$ are each alkyl groups. In a more specific embodiment, $R_1$ is an n-propyl group, $R_2$, $R_3$, $R_5$, $R_6$, $R_7$, $R_8$, $R_{10}$, and $R_{11}$ are each hydrogen, $R_{12}$ is —CH(OH)CH$_2$OH, and $R_4$ and $R_9$ are each n-propyl groups.

In other embodiments of the invention, $R_1$ is hydrogen, $R_2$, $R_5$, $R_6$, $R_7$, $R_8$, and $R_{11}$ are each hydrogen, $R_3$, $R_4$, $R_9$, and $R_{10}$ are each alkyl groups, and $R_{12}$ is —CH(OH)CH$_2$OH. In a more specific embodiment, $R_1$ is hydrogen, $R_2$, $R_5$, $R_6$, $R_7$, $R_8$, and $R_{11}$ are each hydrogen, $R_3$, $R_4$, $R_9$, and $R_{10}$ are each methyl groups, and $R_{12}$ is —CH(OH)CH$_2$OH.

In other embodiments, the clarifying agent is selected from the group consisting of (a) a compound of Formula (I) in which $R_2$, $R_3$, $R_4$, $R_5$, $R_6$, $R_7$, $R_8$, $R_9$, $R_{10}$, and $R_{11}$ are each hydrogen and $R_{12}$ is —CH(OH)CH$_2$OH, (b) a compound of Formula (I) in which $R_2$, $R_3$, $R_5$, $R_6$, $R_7$, $R_8$, $R_{10}$, and $R_{11}$ are each hydrogen, $R_4$ and $R_9$ are each a methyl group, and $R_{12}$ is —CH(OH)CH$_2$OH, (c) a compound of Formula (I) in which $R_2$, $R_5$, $R_6$, $R_7$, $R_8$, and $R_{11}$ are each hydrogen, $R_3$, $R_4$, $R_9$, and $R_{10}$ are each a methyl group, and $R_{12}$ is —CH(OH)CH$_2$OH, and (d) mixtures of at least two of (a), (b), and (c).

The clarifying agent can be present in the compositions of the invention in any suitable amount. As will be understood by those skilled in the art, the suitable amount of the clarifying agent will depend upon several factors, such as the identity of the particular clarifying agent, the particular polymer that is to be clarified using the clarifying agent, and the desired level of clarity and/or haze for the finished polymer composition. In certain possibly preferred embodiments, the clarifying agent is present in the thermoplastic polymer composition in an amount of about 50 ppm to about 5,000 ppm based on the total weight of the thermoplastic polymer composition. In certain possibly preferred embodiments, such as when the clarifying agent is an acetal compound conforming to the structure of Formula (I), the clarifying agent is present in the thermoplastic polymer composition in an amount of about 1,000 ppm to about 2,500 ppm based on the total weight of the thermoplastic polymer composition.

In addition to the clarifying agent, the compositions of the invention contain at least one coloring agent. Suitable coloring agents include, but are not limited to, pigments, dyes, polymeric colorants, and mixtures thereof. As utilized herein, the term "polymeric colorant" refers to a coloring agent comprising a chromophore and at least one oligomeric or polymer constituent bound to the chromophore. Suitable polymeric colorants include, but are not limited to, the polymeric colorants sold by Milliken & Company. The dye can be any suitable dye, such as an acid dye, a solvent dye, a vat dye, or mixtures thereof. Suitable dyes include, but are not limited to, Acid Blue 9, Acid Blue 74, Solvent Blue 97, Vat Blue 6, and mixtures or combinations thereof. For example, in certain embodiments, the coloring agent can comprise a mixture of Vat Blue 6 and Acid Blue 74. In certain possibly preferred embodiments, the composition comprises one or more pigments as the coloring agent. Suitable pigments include, but are not limited to, Pigment Blue 29, Pigment Blue 63, Pigment Violet 15, carbon black, and mixtures thereof. In a preferred embodiment, the composition comprises a mixture of a blue coloring agent and a black coloring agent, such as a mixture of a blue pigment and a black pigment (e.g., a mixture of Pigment Blue 29 and carbon black).

As opposed to compositions in which a coloring agent is used to impart substantial and perceptible color to the composition and any article made therefrom, the compositions of the invention contain a relatively small amount of the coloring agent. Indeed, the amount of coloring agent(s) present in the thermoplastic polymer compositions of the invention is sufficiently low that most observers would describe the polymer composition, or any article made therefrom, as being uncolored or, at most, not appreciably colored. In fact, when observed with the naked eye, the hue imparted to the polymer composition or an article made therefrom by the coloring agent may be perceptible only after the polymer composition or article is compared to a similar composition or article that does not contain the coloring agent. Despite this slight or nearly imperceptible coloration, the inventors have discovered that articles produced from such a composition are often perceived to have lower haze or greater clarity than similar articles produced from a composition that does not contain the coloring agent, even though haze measurements of such articles reveal that the haze values do not differ to any statistically significant degree.

With such a low loading of the coloring agent in the compositions of the invention, it is difficult to meaningfully express the amount of coloring agent present in the compositions of the invention using customary units, such as weight-based concentrations or percentages. This is partly because different coloring agents exhibit different coloring strengths, meaning that a given weight of one coloring agent (e.g., Pigment Blue 29) will impart a different amount of coloration to a composition than the same weight of a different coloring agent (e.g., Vat Blue 6). Thus, if the composition of the invention were simply defined by specifying a weight percentage of the coloring agent, the definition could encompass compositions that do not exhibit the desired effects (e.g., lower perceived haze). For example, if a particularly strong coloring agent were used at the upper end of a weight-based range, the composition might exhibit a readily perceptible coloration and actually be perceived as having more haze than a comparable control without the coloring agent. Accordingly, the inventors have found that the amount of coloring agent present in the compositions of the invention is better characterized by examining certain optical properties of the polymer composition (i.e., the polymer composition of the invention or a polymer composition made using the additive composition of the invention). Then, the amount of coloring agent in the composition is defined as an amount that is sufficient to yield a composition exhibiting the desired optical properties. In particular, the composition is analyzed using ultraviolet-visible (UV-Vis) spectroscopy to assess the absorbance of the composition in the 500 nm to 700 nm range (described as a "blue hue factor ($\alpha$)" below). The inventors have further found that the amount of coloring agent can be characterized by determining, under specified conditions, a normalized brightness value (Y') for the composition.

The thermoplastic polymer composition of the invention preferably exhibits a blue hue factor ($\alpha$) of 0.93 to 1.1. The blue hue factor ($\alpha$) is calculated using the following equation $$\alpha = \frac{\overline{A}_{500-700} - \overline{A}_{800-880}}{0.5 A_{500} + 0.5 A_{700} - \overline{A}_{800-880}}$$

In the equation, $\overline{A}_{500-700}$ is the average (arithmetic mean) of the absorption from 500 nm to 700 nm (calculated at 1 nm intervals with the endpoints included) of the UV-Vis spectrum, $\overline{A}_{800-880}$ is the average (arithmetic mean) of the absorption from 800 nm to 880 nm (calculated at 1 nm intervals with the endpoints included) of the UV-Vis spectrum, $A_{500}$ is the absorption at 500 nm in the UV-Vis spectrum, and $A_{700}$ is the absorption at 700 nm in the UV-Vis spectrum. The UV-Vis spectrum of the thermoplastic polymer composition is measured from a single 0.76 mm (30 mil) injection molded plaque using a conventional ultraviolet-visible spectrophotometer (e.g., an ultraviolet-visible spectrophotometer equipped with an integrating sphere), such as a PerkinElmer LAMBDA™ 35 spectrophotometer with a 2 nm optical slit equipped with a Labsphere RSA-PE-20 integrating sphere accessory. The UV-Vis spectrum is measured from 400 nm to 1,100 nm at a scan speed of approximately 480 nm/min, and the resulting data is smoothed every 4 nm using the spectrophotometer's installed software. The raw absorption data from the spectrophotometer can then be exported and analyzed using spreadsheet software (e.g., Microsoft Excel) to calculate the values necessary to determine the blue hue factor using the equation set forth above.

The thermoplastic polymer composition of the invention preferably exhibits a blue hue factor (α) of 0.93 to 1.1 (e.g., 0.93 to 1.09, 0.93 to 1.08, or 0.93 to 1.07), 0.94 to 1.1 (e.g., 0.94 to 1.09, 0.94 to 1.08, or 0.94 to 1.07), 0.95 to 1.1 (e.g., 0.95 to 1.09, 0.95 to 1.08, or 0.95 to 1.07), 0.96 to 1.1 (e.g., 0.96 to 1.09, 0.96 to 1.08, or 0.96 to 1.07), or 0.97 to 1.1 (e.g., 0.97 to 1.09, 0.97 to 1.08, or 0.97 to 1.07).

The thermoplastic polymer composition of the invention preferably exhibits a normalized brightness value (Y') of 64.0 to 69.6. The normalized brightness value (Y') of the thermoplastic polymer composition is calculated using the following equation:

$$Y' = \frac{Y - Y_o + 100}{1 - \frac{H}{5}}$$

In the equation, Y is the Y value (from the CIE XYZ color space) of the thermoplastic polymer composition measured with a spectrophotometer, $Y_0$ is the Y value of a standard white background (e.g., the spectrophotometer's white calibration tile) measured with the spectrophotometer, and H is the haze. The Y value and haze are measured on five 0.76 mm (30 mil) injection molded plaques (each of which is made from the same thermoplastic polymer composition) that have been stacked with a 0.51 mm (20 mil) air gap between adjacent plaques. When the Y value of the plaques is being measured, the standard white background (e.g., the spectrophotometer's white calibration tile) is placed against the back of the fifth plaque (i.e., against the backside of the plaque that is most distant from the spectrophotometer's aperture) to reflect light back toward the spectrophotometer's detectors. The standard white background is not used when the haze is measured. The haze of the stacked plaques is measured in accordance with ASTM D1003 using a haze meter, such as a BYK-Gardner haze-gard i haze meter. The Y value of the stacked plaques and $Y_0$ value of the standard white background is measured using a spectrophotometer in reflectance mode, such as an X-rite Ci7800 spectrophotometer with a pulsed xenon light source (D65 calibrated). The spectrophotometer is equipped with a 25 mm aperture and a D65 calibrated light source (a UV filter is used to exclude UV light from the light source), and specular reflectance is included in the measurement. Finally, the data from the spectrophotometer is analyzed based on the CIE cool white fluorescent illuminant using a 10° observer color match function. To increase accuracy of the Y value measurement, the plaques preferably are measured twice, and the Y value is taken as the average of the two measurements.

The thermoplastic polymer composition of the invention preferably exhibits a normalized brightness value (Y') of 64.0 to 69.6 (e.g., 64.0 to 69.5, 64.0 to 69.4, 64.0 to 69.3, 64.0 to 69.2, 64.0 to 69.1, 64.0 to 69.0, 64.0 to 68.9, 64.0 to 68.8, or 64.0 to 68.7), 64.5 to 69.6 (e.g., 64.5 to 69.5, 64.5 to 69.4, 64.5 to 69.3, 64.5 to 69.2, 64.5 to 69.1, 64.5 to 69.0, 64.5 to 68.9, 64.5 to 68.8, or 64.5 to 68.7), 65.0 to 69.6 (e.g., 65.0 to 69.5, 65.0 to 69.4, 65.0 to 69.3, 65.0 to 69.2, 65.0 to 69.1, 65.0 to 69.0, 65.0 to 68.9, 65.0 to 68.8, or 65.0 to 68.7), 65.5 to 69.6 (e.g., 65.5 to 69.5, 65.5 to 69.4, 65.5 to 69.3, 65.5 to 69.2, 65.5 to 69.1, 65.5 to 69.0, 65.5 to 68.9, 65.5 to 68.8, or 65.5 to 68.7), 66.0 to 69.6 (e.g., 66.0 to 69.5, 66.0 to 69.4, 66.0 to 69.3, 66.0 to 69.2, 66.0 to 69.1, 66.0 to 69.0, 66.0 to 68.9, 66.0 to 68.8, or 66.0 to 68.7), 66.5 to 69.6 (e.g., 66.5 to 69.5, 66.5 to 69.4, 66.5 to 69.3, 66.5 to 69.2, 66.5 to 69.1, 66.5 to 69.0, 66.5 to 68.9, 66.5 to 68.8, or 66.5 to 68.7), 67.0 to 69.6 (e.g., 67.0 to 69.5, 67.0 to 69.4, 67.0 to 69.3, 67.0 to 69.2, 67.0 to 69.1, 67.0 to 69.0, 67.0 to 68.9, 67.0 to 68.8, or 67.0 to 68.7), 67.1 to 69.6 (e.g., 67.1 to 69.5, 67.1 to 69.4, 67.1 to 69.3, 67.1 to 69.2, 67.1 to 69.1, 67.1 to 69.0, 67.1 to 68.9, 67.1 to 68.8, or 67.1 to 68.7), 67.2 to 69.6 (e.g., 67.2 to 69.5, 67.2 to 69.4, 67.2 to 69.3, 67.2 to 69.2, 67.2 to 69.1, 67.2 to 69.0, 67.2 to 68.9, 67.2 to 68.8, or 67.2 to 68.7), 67.3 to 69.6 (e.g., 67.3 to 69.5, 67.3 to 69.4, 67.3 to 69.3, 67.3 to 69.2, 67.3 to 69.1, 67.3 to 69.0, 67.3 to 68.9, 67.3 to 68.8, or 67.3 to 68.7), 67.4 to 69.6 (e.g., 67.4 to 69.5, 67.4 to 69.4, 67.4 to 69.3, 67.4 to 69.2, 67.4 to 69.1, 67.4 to 69.0, 67.4 to 68.9, 67.4 to 68.8, or 67.4 to 68.7), 67.5 to 69.6 (e.g., 67.5 to 69.5, 67.5 to 69.4, 67.5 to 69.3, 67.5 to 69.2, 67.5 to 69.1, 67.5 to 69.0, 67.5 to 68.9, 67.5 to 68.8, or 67.5 to 68.7), 67.5 to 69.6 (e.g., 67.5 to 69.5, 67.5 to 69.4, 67.5 to 69.3, 67.5 to 69.2, 67.5 to 69.1, 67.5 to 69.0, 67.5 to 68.9, 67.5 to 68.8, or 67.5 to 68.7), 67.6 to 69.6 (e.g., 67.6 to 69.5, 67.6 to 69.4, 67.6 to 69.3, 67.6 to 69.2, 67.6 to 69.1, 67.6 to 69.0, 67.6 to 68.9, 67.6 to 68.8, or 67.6 to 68.7), or 67.7 to 69.6 (e.g., 67.7 to 69.5, 67.7 to 69.4, 67.7 to 69.3, 67.7 to 69.2, 67.7 to 69.1, 67.7 to 69.0, 67.7 to 68.9, 67.7 to 68.8, or 67.7 to 68.7).

Thus, the thermoplastic polymer composition contains an amount of coloring agent(s) sufficient to yield a polymer composition exhibiting a blue hue factor (α) of 0.93 to 1.1 or one of the other ranges for the blue hue factor described above. The thermoplastic polymer composition also preferably contains an amount of coloring agent(s) sufficient to yield a polymer composition exhibiting a normalized brightness value (Y') of 64.0 to 69.6 or one of the other ranges for the normalized brightness value described above.

While the inventors believe that the blue hue factor and/or normalized brightness value are sufficient to describe the amount of coloring agent(s) present in the thermoplastic polymer compositions, the compositions can, for certain preferred embodiments, be further characterized by certain weight ranges for the coloring agents. For example, when the thermoplastic polymer composition comprises carbon black, the thermoplastic polymer composition preferably contains less than 2 ppm (e.g., less than 1.75 ppm) of carbon black, such as from 0.25 to 1.75 ppm (e.g., 0.25 to 1.5 ppm, 0.25 to 1.25 ppm, 0.25 to 1 ppm, or 0.25 to 0.75 ppm) of carbon black. When the thermoplastic polymer composition comprises a blue or violet pigment (e.g., Pigment Blue 29, Pigment Blue 63, or Pigment Violet 15), the composition preferably contains about 4 to about 50 ppm (e.g., about 10 to about 50 ppm or about 4 to about 40 ppm) of the pigment. In a preferred embodiment, the thermoplastic polymer composition comprises 3.5 to 40 ppm of Pigment Blue 29, 0 to 5 ppm of Pigment Violet 15, and 0.25 to 2 ppm of carbon black. In another preferred embodiment, the thermoplastic polymer composition comprises 3.5 to 40 ppm of Pigment Blue 29, 0 to 4 ppm of Pigment Violet 15, and 0.25 to 1.75 ppm of carbon black. In a more specific preferred embodiment, the thermoplastic polymer composition comprises calcium cyclohexane-1,2-dicarboxylate (preferably 300 to 1,000 ppm or 480 to 500 ppm), 10 to 30 ppm of Pigment Blue 29, 0 to 5 ppm of Pigment Violet 15, and 0.2 to 1 ppm of carbon black. In such a preferred embodiment, the total amount of Pigment Blue 29, Pigment Violet 15, and carbon black present in the composition preferably is from 10 to 35 ppm (e.g., 10 to 31 ppm). In another specific preferred embodiment, the thermoplastic polymer composition comprises 2,000 ppm to 4,000 ppm (preferably 3,000 to 4,000 ppm) of a compound of Formula (I) in which $R_1$ is an n-propyl group, $R_2$, $R_3$, $R_5$, $R_6$, $R_7$, $R_8$, $R_{10}$, and $R_{11}$ are each hydrogen, $R_{12}$ is —CH(OH)CH$_2$OH, and $R_4$ and $R_9$ are each n-propyl groups, 3.5 to 25 ppm of Pigment Blue 29, 0 to 4 ppm of Pigment Violet 15, and 0.25 to 1.75 ppm of carbon black. In such a preferred embodiment, the total amount of Pigment Blue 29, Pigment Violet 15, and carbon black present in the composition preferably is from 4.75 to 25 ppm.

As described above, the invention provides an additive composition consisting essentially of at least one clarifying agent and at least one coloring agent. As utilized in connection with this embodiment of the invention, the term "consisting essentially of" is used to distinguish the additive composition from a thermoplastic polymer to which the additive composition has been added. In other words, the term is used to indicate that the additive composition is formulated in such a way that it is intended to be added to a thermoplastic polymer, rather than being used by itself in the fabrication of finished articles. Thus, as used in this context, the term "consisting essentially of" indicates that, if a thermoplastic polymer is present in the additive composition, the relative amount of thermoplastic polymer present in the additive composition is substantially less than the amount of thermoplastic polymer that is present in a "finished" polymer composition that is to be used in molding or other processes for producing an article. Accordingly, in certain possibly preferred embodiments, the additive composition contains about 90 wt. % or less (e.g., about 85 wt. % or less or about 80 wt. % or less) thermoplastic polymer based on the total weight of the additive composition. In certain other embodiments, the additive composition contains about 25 wt. % or less (e.g., about 20 wt. % or less, about 15 wt. % or less, about 10 wt. % or less, or about 5 wt. % or less) thermoplastic polymer based on the total weight of the additive composition. As used in connection with the additive composition, the term "consisting essentially of" is not intended to exclude the presence of other additives that are typically used in thermoplastic polymers, such as nucleating agents, antioxidants, acid scavengers, slip agents, antistatic agents, and polymer processing aids. Thus, the additive composition of the invention can be a masterbatch containing the clarifying agent, the coloring agent, a carrier resin, and, optionally, other additives, or the additive composition can be a non-dusting blend (NDB) containing the clarifying agent, the coloring agent, and, optionally, other additives.

The additive composition described above contains an amount of coloring agent(s) such that, when the additive composition is added to a thermoplastic polymer in an amount sufficient to provide about 100 ppm to about 5,000 ppm (e.g., about 500 ppm to about 4,000 ppm) of the clarifying agent in the resulting thermoplastic polymer composition, the thermoplastic polymer composition exhibits a blue hue factor (α) of 0.93 to 1.1 or one of the other ranges for the blue hue factor described above. The thermoplastic polymer composition also preferably exhibits a normalized brightness value (Y') of 64.0 to 69.6 or one of the other ranges for the normalized brightness value described above.

The thermoplastic polymer used in making such thermoplastic polymer composition can be any of the thermoplastic polymers described above, but preferably is selected from the group consisting of polypropylene homopolymers, polypropylene random copolymers, and mixtures thereof.

As noted above, the invention provides methods for producing thermoplastic polymer compositions. In a first method embodiment, the method comprises the steps of providing a thermoplastic polymer, providing an additive composition comprising at least one clarifying agent and at least one coloring agent, and mixing the thermoplastic polymer and the additive composition to produce a thermoplastic polymer composition. In this method embodiment, the thermoplastic polymer, the clarifying agent, and the coloring agent can be any of those described above. Also, in this embodiment, the thermoplastic polymer and the additive composition can be separately provided. In other words, the thermoplastic polymer and the additive composition are provided in separate forms or compositions that are not mixed together until the recited mixing step. In this embodiment, the thermoplastic polymer can be provided in a composition comprising other additives typically used in polymer processing, such as antioxidants, acid scavengers, slip agents, and polymer processing aids. The additive composition can also comprise other additives typically used in polymer processing, such as those described above.

In a second method embodiment, the method comprises the steps of providing a thermoplastic polymer, providing at least one clarifying agent, providing at least one coloring agent, and mixing the thermoplastic polymer, the clarifying agent, and the coloring agent to produce a thermoplastic polymer composition. In this method embodiment, the thermoplastic polymer, the clarifying agent, and the coloring agent can be any of those described above. Also, in this embodiment, the thermoplastic polymer, the clarifying agent, and the coloring agent can be separately provided. In other words, the thermoplastic polymer, the clarifying agent, and the coloring agent are provided in separate forms or compositions that are not mixed together until the recited mixing step. As in the other method embodiment, the thermoplastic polymer can be provided in a composition comprising other additives typically used in polymer processing. Similarly, the clarifying agent and the coloring agent can be contained in separate compositions comprising other additives typically used in polymer processing.

Each of the method embodiments described above involves a mixing step. In each method, the separate components can be mixed using any suitable technique or apparatus. For example, the components can be mixed in a paddle blender, ribbon blender, double cone blender, vertical screw mixer (e.g., Nauta mixer), plough mixer, or high shear mixer. Several of the mixing apparatus listed above can be operated in either a batch or continuous mode and, therefore, the mixing step can be performed in either a batchwise or continuous fashion. The components can be mixed for any suitable amount of time, but generally the components are mixed until they are substantially uniformly blended.

The thermoplastic polymer composition described herein is believed to be useful in producing thermoplastic articles. The thermoplastic polymer compositions can be formed into the desired thermoplastic article by any suitable technique, such as injection molding, injection rotational molding, blow molding (e.g., injection blow molding or injection stretch blow molding), extrusion (e.g., sheet extrusion, film extrusion, cast film extrusion, or foam extrusion), extrusion blow molding, thermoforming, rotomolding, film blowing (blown film), film casting (cast film), and the like.

The thermoplastic polymer composition described herein can be used to produce any suitable article or product. Suitable products include, but are not limited to, medical devices (e.g., pre-filled syringes for retort applications, intravenous supply containers, and blood collection apparatus), food packaging, fluid containers (e.g., bottles, containers for drinks, medications, personal care compositions, shampoos, and the like), housewares (e.g., reusable food containers, storage totes, and the like), apparel cases, microwavable articles, shelving, cabinet doors, mechanical parts, automobile parts, sheets (e.g., sheets for thermoforming processes), preforms for blow molding, pipes, tubes, injection molded parts, rotationally molded parts, blow molded parts, films, fibers, and the like.

The following examples further illustrate the subject matter described above but, of course, should not be construed as in any way limiting the scope thereof.

Example 1

This example demonstrates the production of thermoplastic polymer compositions according to the invention and certain properties of such polymer compositions. Several different polymer compositions were prepared using a polypropylene homopolymer resin, specifically LyondellBasell Pro-fax 6301 (HPP6301) polypropylene homopolymer resin. Each polymer composition was made by combining the resin with the components listed in Table 1 below and extruding the mixture through a Deltaplast single screw extruder. Each extruded polymer composition was then injection molded into several 0.76 mm (30 mil) plaques (measuring 50.8 mm×76.2 mm×0.76 mm or 2.00 inch×3.00 inch×0.03 inch) using a 40-ton Arburg injection molding machine. These plaques were then analyzed as described below.

To accurately add very small amounts of each coloring agent to the polymer composition and ensure that the coloring agents were well-dispersed in the composition, each coloring agent was separately added to the resin using a 0.02 wt. % coloring agent masterbatch. These 0.02 wt. % coloring agent masterbatches were produced by first making a 1 wt. % masterbatch of the coloring agent and then letting down the 1 wt. % masterbatch into resin to make a 0.02 wt. % coloring agent masterbatch. Each 1 wt. % coloring agent masterbatch was produced by combining 1 wt. % of the coloring agent, a standard stabilization package (i.e., 500 ppm Irganox 1010, 1000 ppm Irgafos 168, and 800 ppm calcium stearate), and HPP6301 resin. The resulting mixture was then melt compounded on a Deltaplast single screw extruder (1 inch diameter, L/D 30:1). Second, 1 part by weight of the 1 wt. % coloring agent masterbatch was then mixed with 49 parts by weight of HPP6301 resin pellets (which had been pre-compounded with the standard stabilization package described above). This mixture was then extruded through the Deltaplast single screw extruder to produce the 0.02 wt. % coloring agent masterbatch. The following 0.02 wt. % coloring agent masterbatches were produced and used to make the polymer compositions: a 0.02 wt. % ultramarine blue (Pigment Blue 29) masterbatch; a 0.02 wt. % ultramarine violet (Pigment Violet 15) masterbatch; and a 0.02 wt. % carbon black masterbatch. The carbon black masterbatch was made with AROSPERSE® F138 carbon black (from Orion Engineered Carbons).

Masterbatch compositions were also used to add each clarifying agent to the polymer composition. A 4 wt. % Hyperform® HPN 20E nucleating agent masterbatch was produced by mixing Hyperform® HPN 20E nucleating agent (from Milliken & Company), 500 ppm of Irganox 1010, 1,000 ppm or Irgafos 168, a Mg—Al hydrotalcite acid scavenger (DHT-4V from Kisuma Chemicals), and the HPP6301 resin. The Hyperform® HPN 20E nucleating agent contains the clarifying agent calcium cis-cyclohexane-1,2-dicarboxylate. The mixture was extruded on the Deltaplast extruder to yield the masterbatch. A 20 wt. % 1,2,3-trideoxy-4,6:5,7-bis-O-[(4-propylphenyl)methylene]nonitol masterbatch was prepared by mixing 1,2,3-trideoxy-4,6:5,7-bis-O-[(4-propylphenyl)methylene]nonitol, the standard stabilization package described above, and the HPP6301 resin. The mixture was extruded on the Deltaplast extruder to yield the masterbatch.

As noted above, Table 1 lists the clarifying agent and the coloring agent(s) used in making each polymer composition. The amount provided in Table 1 represents the final concentration of the clarifying agent or the coloring agent in the polymer composition. Thus, the amount of the applicable masterbatch that was added to the resin was greater than the amount listed in Table 1. In the table, "UMB" is ultramarine blue, "UMV" is ultramarine violet, "CB" is carbon black, "C.A. 1" is Hyperform® HPN 20E nucleating agent, and "C.A.2" is 1,2,3-trideoxy-4,6:5,7-bis-O-[(4-propylphenyl)methylene]nonitol.

TABLE 1

| Clarifying Agent and Coloring Agent concentrations for Samples 1-7. | | | | | |
|---|---|---|---|---|---|
| Sample | C.A.1 (ppm) | C.A.2 (ppm) | UMB (ppm) | UMV (ppm) | CB (ppm) |
| 1 | 500 | | 0 | 0 | 0 |
| 2 | 500 | | 15 | 0 | 0 |
| 3 | 500 | | 30 | 0 | 0.5 |
| 4 | | 4,000 | 0 | 0 | 3.6 |
| 5 | | 4,000 | 9 | 6 | 0 |
| 6 | | 4,000 | 0 | 0 | 0 |
| 7 | | 4,000 | 15.7 | 0 | 0.5 |

The plaques made from each polymer composition (Samples 1-7) were then analyzed to determine the blue hue factor ($\alpha$) and normalized brightness value (Y') as described above. In particular, the blue hue factor ($\alpha$) of each polymer composition was calculated from the equation described above using data obtained from a UV-Vis spectrum of a single plaque made from the polymer composition. The UV-Vis spectrum of the thermoplastic polymer composition was measured using a PerkinElmer LAMBDA™ 35 spectrophotometer with a 2 nm optical slit equipped with a Labsphere RSA-PE-20 integrating sphere accessory. The UV-Vis spectrum was measured from 400 nm to 1,100 nm at a scan speed of approximately 480 nm/min, and the resulting data was smoothed every 4 nm using the spectrophotometer's installed software. The raw absorption data from the spectrophotometer was then exported and analyzed using Microsoft Excel to calculate the $\overline{A}_{500-700}$ and $\overline{A}_{500-700}$ values. The resulting blue hue factor ($\alpha$) for each polymer composition is set forth in Table 2 below.

The normalized brightness value (Y') was calculated from the equation described above using data obtained from a stack of five plaques (all made from the same polymer composition) arranged with a 0.51 mm (20 mil) air gap between adjacent plaques. The haze of the stacked plaques was measured in accordance with ASTM D1003 using a BYK-Gardner haze-gard i haze meter. The Y value of the stacked plaques was measured in reflectance mode using an X-rite Ci7800 spectrophotometer with a pulsed xenon light source (D65 calibrated). As described above, the spectrophotometer's white calibration tile was placed against the backside of the fifth plaque to reflect light back to the spectrophotometer's detectors. The spectrophotometer was equipped with a 25 mm aperture and a D65 calibrated light source (a UV filter is used to exclude UV light from the light source), and specular reflectance was included in the measurement. Finally, the data from the spectrophotometer was analyzed based on the CIE cool white fluorescent illuminant using a 10° observer color match function. To increase accuracy of the Y value measurement, the plaques were measured twice, and the Y value was taken as the average of the two measurements. The Y value of the spectrophotometer's white calibration tile ($Y_o$) was measured with the spectrophotometer using the same settings as used in measuring the stack of plaques. The resulting normalized brightness value (Y') for each polymer composition is set forth in Table 2 below.

TABLE 2

Blue hue factor ($\alpha$) and normalized brightness value (Y') for Samples 1-7.

| Sample | Blue hue factor ($\alpha$) | Normalized brightness value (Y') |
|---|---|---|
| 1 | 0.86 | 73.0 |
| 2 | 0.94 | 72.1 |
| 3 | 1.07 | 68.7 |
| 4 | 0.92 | 57.9 |
| 5 | 0.97 | 70.1 |
| 6 | 0.9 | 71.8 |
| 7 | 0.98 | 67.7 |

Thin wall injection molded cups (having a wall thickness of 0.71 mm (28 mil) and a volume of approximately 470 mL (16 ounces)) made from each polymer composition were then presented to panelists to determine which polymer compositions exhibited less apparent haze. The injection molded cups were arranged in stacks of ten cups (all of which were made from the same polymer composition) and viewed under diffuse fluorescent lighting to simulate the conditions under which the cups would typically be encountered in a retail setting. When cups made from Sample 2 were presented alongside cups made from Sample 3, 43 out of 50 panelists believed that the cups made from Sample 3 appeared clearer or exhibited less apparent haze. When cups made from Sample 5 were presented alongside cups made from Sample 7, 20 out of 30 panelists believed that the cups made from Sample 7 appeared clearer or exhibited less apparent haze. The inventors believe that these differences in preference are statistically significant. Further, the inventors believe that these preferences demonstrate that polymer compositions exhibiting the blue hue factor ($\alpha$) and normalized brightness value (Y') values recited in the claims and described above will be perceived as exhibiting less apparent haze than similar polymer compositions that do not exhibit these properties.

Example 2

This example demonstrates the production of thermoplastic polymer compositions according to the invention and certain properties of such polymer compositions. Several different polymer compositions were prepared using a polypropylene homopolymer resin, specifically LyondellBasell Pro-fax 6301 (HPP6301) polypropylene homopolymer resin. Each polymer composition was made by combining the resin with the components listed in Table 3 below. The polymer compositions were produced in accordance with the general procedure outlined in Example 1 above. The polymer compositions were also molded into plaques and analyzed as described in Example 1 above. The results of these measurements are provided in Table 4 below.

TABLE 3

Table 1. Clarifying Agent and Coloring Agent concentrations for Samples 1-7.

| Sample | C.A.1 (ppm) | C.A.2 (ppm) | UMB (ppm) | UMV (ppm) | CB (ppm) |
|---|---|---|---|---|---|
| 8 | 0 | 4000 | 1.4 | 0 | 2.3 |
| 9 | 0 | 4000 | 3.8 | 0 | 1.1 |
| 10 | 0 | 4000 | 8.3 | 0 | 1 |
| 11 | 0 | 4000 | 8.7 | 0 | 1.66 |
| 12 | 0 | 4000 | 11 | 0 | 2 |
| 13 | 0 | 4000 | 12.2 | 0 | 2.4 |
| 14 | 0 | 4000 | 13.1 | 0 | 1.3 |
| 15 | 0 | 4000 | 13.5 | 0 | 0.3 |
| 16 | 0 | 4000 | 15.4 | 0 | 1.8 |
| 17 | 0 | 4000 | 21.6 | 0 | 2.8 |
| 18 | 0 | 4000 | 23.13 | 0 | 0 |
| 19 | 0 | 4000 | 23.2 | 0 | 3.5 |
| 20 | 0 | 4000 | 25 | 0 | 1 |
| 21 | 500 | 0 | 0 | 0 | 0.25 |
| 22 | 500 | 0 | 0 | 0 | 0.5 |
| 23 | 500 | 0 | 0 | 0 | 1 |
| 24 | 500 | 0 | 0 | 0 | 2 |
| 25 | 500 | 0 | 0 | 0 | 3 |
| 26 | 500 | 0 | 0 | 0 | 5 |
| 27 | 500 | 0 | 7.5 | 0 | 0 |
| 28 | 500 | 0 | 7.5 | 0 | 0.25 |
| 29 | 500 | 0 | 7.5 | 0 | 0.5 |
| 30 | 489 | 0 | 10.5 | 0 | 0.18 |
| 31 | 486 | 0 | 13.5 | 0 | 0.23 |
| 32 | 485 | 0 | 15 | 0 | 0.25 |
| 33 | 500 | 0 | 15 | 0 | 1 |
| 34 | 483 | 0 | 16.5 | 0 | 0.28 |
| 35 | 480 | 0 | 19.5 | 0 | 0.33 |
| 36 | 500 | 0 | 20 | 0 | 0.5 |
| 37 | 480 | 0 | 20.1 | 0 | 0.34 |
| 38 | 500 | 0 | 22.5 | 0 | 0.5 |
| 39 | 500 | 0 | 30 | 0 | 0 |
| 40 | 500 | 0 | 30 | 0 | 2 |
| 41 | 500 | 0 | 45 | 0 | 0 |
| 42 | 500 | 0 | 45 | 0 | 0.5 |
| 43 | 500 | 0 | 60 | 0 | 0 |
| 44 | 500 | 0 | 60 | 0 | 0.5 |
| 45 | 500 | 0 | 60 | 0 | 1 |
| 46 | 500 | 0 | 60 | 0 | 2 |
| 47 | 500 | 0 | 60 | 0 | 5 |
| 48 | 0 | 2000 | 6 | 4 | 0.25 |
| 49 | 0 | 2000 | 12 | 0 | 0.4 |

TABLE 4

Blue hue factor ($\alpha$) and normalized brightness value (Y') for Samples 8-49.

| Sample | Blue hue factor ($\alpha$) | Normalized brightness value (Y') |
|---|---|---|
| 8 | 0.90 | 62.9 |
| 9 | 0.93 | 66.5 |
| 10 | 0.94 | 66.6 |
| 11 | 0.93 | 64.9 |
| 12 | 0.95 | 62.8 |
| 13 | 0.94 | 62.3 |
| 14 | 0.95 | 65.4 |
| 15 | 0.95 | 68.1 |
| 16 | 0.95 | 63.5 |
| 17 | 0.97 | 60.2 |

TABLE 4-continued

Blue hue factor (α) and normalized brightness value (Y') for Samples 8-49.

| Sample | Blue hue factor (α) | Normalized brightness value (Y') |
|---|---|---|
| 18 | 0.99 | 69.2 |
| 19 | 0.98 | 58.3 |
| 20 | 0.99 | 64.3 |
| 21 | 0.88 | 71.5 |
| 22 | 0.85 | 70.8 |
| 23 | 0.85 | 68.9 |
| 24 | 0.89 | 63.8 |
| 25 | 0.88 | 62.2 |
| 26 | 0.89 | 55.8 |
| 27 | 0.92 | 71.6 |
| 28 | 0.91 | 71.1 |
| 29 | 0.89 | 70.0 |
| 30 | 0.94 | 69.0 |
| 31 | 0.97 | 68.6 |
| 32 | 0.98 | 68.6 |
| 33 | 0.96 | 67.8 |
| 34 | 0.99 | 68.5 |
| 35 | 1.02 | 67.9 |
| 36 | 1.00 | 69.3 |
| 37 | 1.02 | 67.6 |
| 38 | 1.00 | 69.4 |
| 39 | 1.03 | 70.8 |
| 40 | 1.04 | 63.5 |
| 41 | 1.15 | 67.4 |
| 42 | 1.17 | 65.6 |
| 43 | 1.23 | 66.3 |
| 44 | 1.25 | 64.7 |
| 45 | 1.18 | 62.9 |
| 46 | 1.16 | 59.9 |
| 47 | 1.15 | 52.6 |
| 48 | 0.932 | 69.1 |
| 49 | 0.964 | 68.3 |

Based on the results of the panel survey described in Example 1 above, the inventors believe that those samples above that exhibit the blue hue factor (α) and normalized brightness value (Y') recited in the claims and described above will be perceived as exhibiting less apparent haze than similar polymer compositions that do not exhibit these properties.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A thermoplastic polymer composition comprising:
   (a) a thermoplastic polymer;
   (b) at least one clarifying agent, wherein the clarifying agent is a compound of Formula (I) below

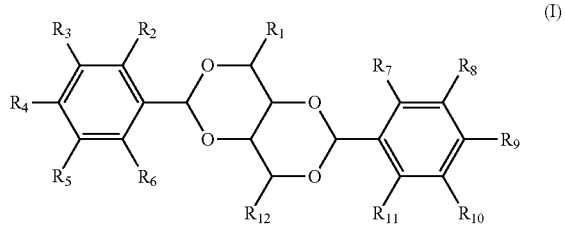

where $R_1$ is an n-propyl group, $R_2$, $R_3$, $R_5$, $R_6$, $R_7$, $R_8$, $R_{10}$, and $R_{11}$ are each hydrogen, $R_{12}$ is —CH(OH)CH$_2$OH, and $R_4$ and $R_9$ are each n-propyl groups; and
   (c) at least one coloring agent,
   wherein the amount of clarifying agent in the thermoplastic polymer composition is from about 50 ppm to about 5,000 ppm based on the total weight of the thermoplastic polymer composition, and the thermoplastic polymer exhibits a blue hue factor (α) of 0.93 to 1.1 and a normalized brightness value (Y') of 64.0 to 69.6.

2. The thermoplastic polymer composition of claim 1, wherein the thermoplastic polymer is a polyolefin.

3. The thermoplastic polymer composition of claim 2, wherein the thermoplastic polymer is selected from the group consisting of polypropylene homopolymers, polypropylene random copolymers, and mixtures thereof.

4. The thermoplastic polymer composition of claim 1, wherein the clarifying agent is present in an amount of about 1,000 ppm to about 2,500 ppm.

5. The thermoplastic polymer composition of claim 1, wherein the coloring agent is a pigment.

6. A method for producing a thermoplastic polymer composition, the method comprising the steps of:

(a) providing a thermoplastic polymer;
(b) providing an additive composition comprising:
  (i) at least one clarifying agent, wherein the clarifying agent is a compound of Formula (I) below

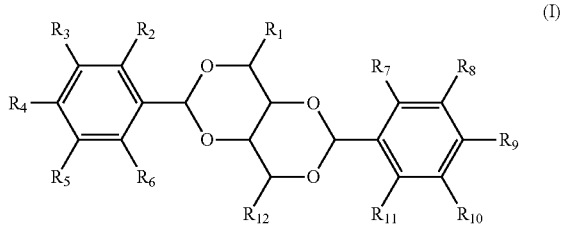

where $R_1$ is an n-propyl group, $R_2$, $R_3$, $R_5$, $R_6$, $R_7$, $R_8$, $R_{10}$, and $R_{11}$ are each hydrogen, $R_{12}$ is —CH(OH)CH$_2$OH, and $R_4$ and $R_9$ are each n-propyl groups;
  (ii) at least one coloring agent; and
(c) mixing the thermoplastic polymer and the additive composition to produce a thermoplastic polymer composition,
wherein the amount of clarifying agent in the thermoplastic polymer composition is from about 50 ppm to about 5,000 ppm based on the total weight of the thermoplastic polymer composition, and the thermoplastic polymer exhibits a blue hue factor (α) of 0.93 to 1.1 and a normalized brightness value (Y') of 64.0 to 69.6.

7. The method of claim 6, wherein the thermoplastic polymer is a polyolefin.

8. The method of claim 7, wherein the thermoplastic polymer is selected from the group consisting of polypropylene homopolymers, polypropylene random copolymers, and mixtures thereof.

9. The method of claim 6, wherein the clarifying agent is present in an amount of about 1,000 ppm to about 2,500 ppm.

10. The method of claim 6, wherein the coloring agent is a pigment.

11. A method for producing a thermoplastic polymer composition, the method comprising the steps of:
(a) providing a thermoplastic polymer;
(b) providing at least one clarifying agent, wherein the clarifying agent is a compound of Formula (I) below

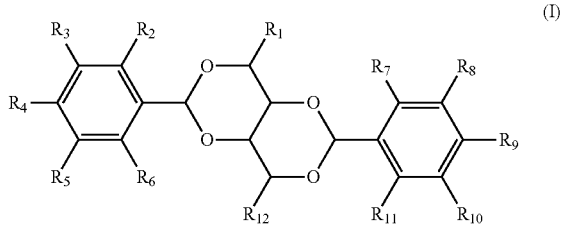

where $R_1$ is an n-propyl group, $R_2$, $R_3$, $R_5$, $R_6$, $R_7$, $R_8$, $R_{10}$, and $R_{11}$ are each hydrogen, $R_{12}$ is —CH(OH)CH$_2$OH, and $R_4$ and $R_9$ are each n-propyl groups;
(c) providing at least one coloring agent; and
(d) mixing the thermoplastic polymer, the clarifying agent, and the coloring agent to produce a thermoplastic polymer composition,
wherein the amount of clarifying agent present in the thermoplastic polymer composition is from about 100 ppm to about 5,000 ppm based on the total weight of the thermoplastic polymer composition, and the thermoplastic polymer exhibits a blue hue factor (α) of 0.93 to 1.1 and a normalized brightness value (Y') of 64.0 to 69.6.

12. The method of claim 11, wherein the thermoplastic polymer is a polyolefin.

13. The method of claim 12, wherein the thermoplastic polymer is selected from the group consisting of polypropylene homopolymers, polypropylene random copolymers, and mixtures thereof.

14. The method of claim 11, wherein the clarifying agent is present in an amount of about 1,000 ppm to about 2,500 ppm.

15. The method of claim 11, wherein the coloring agent is a pigment.

16. The thermoplastic polymer composition of claim 5, wherein the polymer composition comprises carbon black.

17. The thermoplastic polymer composition of claim 16, wherein the thermoplastic polymer composition comprises less than 2 ppm of carbon black.

18. The thermoplastic polymer composition of claim 5, wherein the thermoplastic polymer composition comprises a blue pigment, a violet pigment, or a mixture thereof.

19. The thermoplastic polymer composition of claim 18, wherein the blue or violet pigment is selected from the group consisting of Pigment Blue 29, Pigment Blue 63, Pigment Violet 15, and mixtures thereof.

20. The thermoplastic polymer composition of claim 18, wherein the thermoplastic polymer composition comprises about 4 to about 50 ppm of pigment.

21. The thermoplastic polymer composition of claim 5, wherein the thermoplastic polymer composition comprises 3.5 to 40 ppm of Pigment Blue 29, 0 to 5 ppm of Pigment Violet 15, and 0.25 to 2 ppm of carbon black.

22. The thermoplastic polymer composition of claim 21, wherein the thermoplastic polymer composition comprises 3.5 to 25 ppm of Pigment Blue 29, 0 to 4 ppm of Pigment Violet 15, and 0.25 to 1.75 ppm of carbon black.

23. The thermoplastic polymer composition of claim 22, wherein the total amount of Pigment Blue 29, Pigment Violet 15, and carbon black present in the composition is from 4.75 to 25 ppm.

24. The method of claim 10, wherein the polymer composition comprises carbon black.

25. The method of claim 24, wherein the thermoplastic polymer composition comprises less than 2 ppm of carbon black.

26. The method of claim 10, wherein the thermoplastic polymer composition comprises a blue pigment, a violet pigment, or a mixture thereof.

27. The method of claim 26, wherein the blue or violet pigment is selected from the group consisting of Pigment Blue 29, Pigment Blue 63, Pigment Violet 15, and mixtures thereof.

28. The method of claim 26, wherein the thermoplastic polymer composition comprises about 4 to about 50 ppm of pigment.

29. The method of claim 10, wherein the thermoplastic polymer composition comprises 3.5 to 40 ppm of Pigment Blue 29, 0 to 5 ppm of Pigment Violet 15, and 0.25 to 2 ppm of carbon black.

30. The method of claim 29, wherein the thermoplastic polymer composition comprises 3.5 to 25 ppm of Pigment Blue 29, 0 to 4 ppm of Pigment Violet 15, and 0.25 to 1.75 ppm of carbon black.

31. The method of claim 15, wherein the polymer composition comprises carbon black.

32. The method of claim 31, wherein the thermoplastic polymer composition comprises less than 2 ppm of carbon black.

33. The method of claim 15, wherein the thermoplastic polymer composition comprises a blue pigment, a violet pigment, or a mixture thereof.

34. The method of claim 33, wherein the blue or violet pigment is selected from the group consisting of Pigment Blue 29, Pigment Blue 63, Pigment Violet 15, and mixtures thereof.

35. The method of claim 33, wherein the thermoplastic polymer composition comprises about 4 to about 50 ppm of pigment.

36. The method of claim 15, wherein the thermoplastic polymer composition comprises 3.5 to 40 ppm of Pigment Blue 29, 0 to 5 ppm of Pigment Violet 15, and 0.25 to 2 ppm of carbon black.

37. The method of claim 36, wherein the thermoplastic polymer composition comprises 3.5 to 25 ppm of Pigment Blue 29, 0 to 4 ppm of Pigment Violet 15, and 0.25 to 1.75 ppm of carbon black.

\* \* \* \* \*